3,042,612
LOW FLUID LOSS COMPOSITION
Albert H. Roebuck, Fort Worth, Tex., and James B. Scott, Ponca City, Okla., assignors to Continental Oil Company, Ponca City, Okla., a corporation of Delaware
No Drawing. Filed Oct. 26, 1959, Ser. No. 848,505
15 Claims. (Cl. 252—8.55)

This invention relates to the treatment of fluids used in well working operations, such as drilling and hydraulic fracturing.

In the art of fracturing oil and gas wells, a special fluid composition (usually called fracturing fluid) is pumped down the well into contact with the formation to be fractured, and the pressure of the fluid composition is increased until the formation is fractured by hydraulic pressure. It is then usually desirable to incorporate a propping material, such as sand, in the fracturing fluid, whereby the propping material is carried into the fracture with the fracturing fluid. After the fracture has been extended to the extent desired, the pressure in the well bore is decreased and the fracturing fluid flows back into the well bore. At least a portion of the propping material is deposited in the fracture for maintaining the fracture open and enhancing the flow of formation fluids through the fracture into the well bore.

The type of fracture obtained is dependent primarily upon the penetrating characteristics of the fracturing fluid. That is, a low penetration fluid usually gives a vertical fracture (ordinarily the most desirable), and a high penetrating fracturing fluid usually gives a horizontal fracture (frequently along weak bedding planes in the formation, which is undesirable). Therefore, a primary concern in the art has been to reduce the penetrating characteristics (usually called the fluid loss) of fracturing fluids. Another consideration in the manufacture of fracturing fluids is viscosity. Some operators desire a high viscosity fracturing fluid, and others desire a low viscosity fracturing fluid. Therefore, it is highly desirable from an economical point of view that the same basic fracturing fluid can be readily adapted to either a high or low viscosity fluid.

Many attempts have been made to solve these problems of the art, and particularly the reduction of the fluid loss of fracturing fluids. The usual solution is to incorporate a large quantity of oil-insoluble materials, such as blown asphalt and rubber, in an oil carrier for literally plastering the face of a formation by an accumulation of the plastering material. These large amounts of plastering materials require correspondingly large amounts of dispersing agents and gelling agents to maintain the plastering materials in suspension under the various operating conditions. Fracturing fluids made in this manner undoubtedly attain good fluid loss properties, but the cost thereof is unnecessarily high and fluid invariably has a high viscosity. Also, the plastering materials heretofore used have relatively large particle sizes, thereby necessitating a large amount of the material to effectively seal a formation face.

Similar concepts have been used in making drilling fluids.

A recent development in the art of making fracturing fluids and fracturing fluid additives is shown in U.S. Patent 2,779,735, Jack L. Brown et al., issued January 29, 1957. This patent teaches the use of finely divided oil-insoluble materials having a substantial portion of its particles below 2 microns in size and an agglutinant dispersant in an oil carrier to form a fracturing fluid. The agglutinant has sufficient strength to cooperate with the small particles of the oil-insoluble, finely divided material to form a substantially fluid-impervious seal on the face of the formation.

The present invention relates to an improved fluid loss additive and composition of the general type described in the above-identified patent.

An important object of this invention is to provide an economical well working, low fluid loss composition.

Another object of this invention is to provide a basic low fluid loss composition having a low viscosity, wherein the viscosity may be easily increased as desired.

A further object of this invention is to provide a low fluid loss composition containing only a minor amount of solid material.

A more general object of this invention is to facilitate and economize well working operations.

Another specific object of this invention is to provide a low fluid loss composition comprising an oil carrier and only a minor amount of additive for reducing the fluid loss properties of the composition.

These and other objects of the invention will become more readily apparent from the following detailed description and discussion.

The foregoing objects are realized broadly by providing as a fluid loss additive for petroleum oil a composition comprising an organo sulfonate dispersing agent, an agglutinant, finely divided solids containing particles in the size range of 0.0025 to 2 microns and an at least partially oil-soluble surface active agent selected from the group consisting of alkylene polyamines, N-acyl sarcosines in which the acyl group contains from 11 to 18 carbon atoms and alkyl substituted imidazolines having the formula

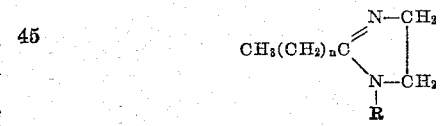

in which n is at least 10 and R is hydrogen or an alkyl or substituted alkyl group containing 1 to 3 carbon atoms. In one aspect of the invention, the foregoing additive composition is present in a petroleum oil. In another aspect of the invention, a petroleum oil containing said additive composition is employed in working a well.

The petroleum oil which is used as the carrier or vehicle in the improved fracturing and drilling fluid of this invention can be substantially any petroleum hydrocarbon liquid. For example, it is within the scope of the invention to use crude oil which is normally available in the vicinity of the well working operation. Such crude oils range in viscosity from 5 to 100 centipoises, but usually between 15 to 25 centipoises taken at a temperature of 70° F. In addition, refined petroleum products can be used, such as kerosene, pale oil, diesel fuel, fuel oil, etc.

The present invention contemplates the use of any oil-insoluble solids which can be obtained in finely divided form. Illustrative of the solids which can be employed are calcium carbonate, calcium chloride, calcium sulfate, carbon black, carboxy methyl cellulose, fuller's earth and similar products, magnesium or barium sulfate, mica, Portland cement, sodium borate, sodium carbonate, sodium chloride, sodium silicate, sodium sulfate, spent catalyst and walnut shells.

The sulfonates which are suitable for use in the invention are oil-soluble and include the alkali metal and alkaline earth metal soaps of alkyl sulfonic acids, alkaryl sulfonic acids, the so-called mahogany or petroleum sulfonic acids, and the like. The mahogany soaps include particularly the oil-soluble aromatic sulfonates from petroleum. Many of the aromatic sulfonates have cycloalkyl (i.e., naphthenic) groups in the side chains attached to the benzene ring. The mahogany soaps may include nonaromatic sulfonates produced in conventional sulfuric acid refining of lubricating oil distillates and from the industrial use of fuming sulfuric acid in the refining of petroleum. The industrial production of oil-soluble mahogany sulfonates from petroleum is well understood in the art and is described in the literature. Normally, the alkyl sulfonates require about 24 carbon atoms for oil-solubility. The alkaryl sulfonates, however, require an alkyl portion totaling only about 18 carbon atoms. To attain the requisite oil-solubility, therefore, requires that the hydrocarbon portion of the sulfonate have a molecular weight between about 250 and 1,000. Preferably, this molecular weight is between 300 and 700. Particularly useful sulfonates include the calcium diwaxbenzene sulfonates, diwaxtoluene sulfonates, and postdodecylbenzene sulfonates. The wax used in making the wax aromatic sulfonate is obtained from different sources of crude petroleum oil. Various grades of paraffin wax are made with different melting points. The 126–128° F. (52.2–53.3° C.) melting point wax is a mixture of organic compounds with the molecular weight averaging in the range of 330–340. The average carbon content of this mixture of organic compounds will be around 24.

Other sulfonates which may be used in the composition and process of this invention include, for example, mono- and poly-wax substituted naphthalene sulfonates, diphenyl ether sulfonates, naphthalene disulfide sulfonates, diphenyl amine sulfonates, dilauryl betanaphthol sulfonates, dicapryl nitro-naphthalene sulfonates, unsaturated paraffin wax sulfonates, hydroxy substituted paraffin wax sulfonates, tetra-amylene sulfonates, mono- and chlorosubstituted paraffin wax sulfonates, nitrosoparaffin wax sulfonates; cycloaliphatic sulfonates such as lauryl- cyclohexyl sulfonates, mono- and poly-wax substituted cyclohexyl sulfonates, and the like. The expression "petroleum sulfonate" is intended to cover all sulfonates derived from petroleum products.

A preferred oil-soluble sulfonate is the product produced by neutralizing postdodecylbenzene overhead sulfonic acid with calcium hydroxide. Postdodecylbenzene overhead sulfonic acid is the acid produced by sulfonating postdodecylbenzene overhead, which is a residue fraction obtained in the distillation of the product resulting from the alkylation of benzene with dodecene. The average physical properties of postdodecylbenzene overhead before sulfonating are as follows.

Specific gravity at 48° C. _____ 0.866
Average molecular weight_____ 300
A.S.T.M. (D–158 Engler):
   I.B.P. _____ °F____ 647
   5 _____ °F____ 625
   10 _____ °F____ 630
   50 _____ °F____ 656
   90 _____ °F____ 710
   95 _____ °F____ 730
   F.B.P. _____ °F____ 738
Refractive index_____ 1.4902
Viscosity at 100° F., SUS_____ 110
Bromine number_____ .40

In general, cationic, anionic and nonionic agglutinants can be used in the additive composition. As used herein, and in the appended claims, the term "agglutinant" may be defined as an oil-insoluble surface active agent which, when dispersed in oil, forms a gelatinous precipitate in the presence of a small amount of water. This includes straight chain compounds containing from 5 to 24, preferably 5–18 carbon atoms, and branched chain compounds containing from 5 to 18 carbon atoms. Particularly effective agglutinants include sodium caproate, sodium oleate, sodium stearate, sodium dodecylbenzene sulfonate, and sodium pelargonate. Sodium dodecylbenzenesulfonate is the final product produced by sulfonating dodecylbenzene followed by neutralization with sodium hydroxide. Physical properties of dodecylbenzene are approximately as follows.

Specific gravity at 16° C._____ 0.8742
Average molecular weight_____ 232
A.S.T.M. (D–158 Engler):
   I.B.P. _____ °F____ 535
   5 _____ °F____ 545
   10 _____ °F____ 550
   50 _____ °F____ 560
   90 _____ °F____ 580
   97 _____ °F____ 592
   F.B.P. _____ °F____ 603
Refractive index at 20° C._____ 1.4885
Viscosity at 20° C., centipoises_____ 14
Bromine number_____ 0.16

The agglutinants also include polyethylene oxide derivatives of alcohols, fatty acids, amines, amides, and phenols having an amount of ethylene oxide to solubilize the derivative in water. Generally speaking, the alcohol fatty acid, amine, amide, or phenol is reacted with about 1 to 2.5 times its weight of ethylene oxide to obtain a hydrophylic oil-insoluble surface active agent which forms a gelatinous precipitate in the presence of a small amount of water.

The at least partially oil-soluble surface active agent which is utilized in the additive composition along with the organo sulfonate dispersing agent, agglutinant and finely divided solid includes amines such as alkylene polyamines, for example, ethylene diamine, diethylene triamine, triethylene tetramine, tetraethylene pentamine, etc.; alkyl substituted imidazolines having the formula

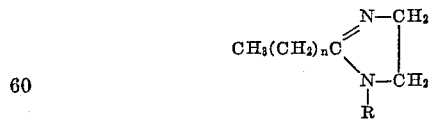

in which $n$ is at least 10 and R is hydrogen or an alkyl or substituted alkyl group containing from 1 to 3 carbon atoms, for example, (1)

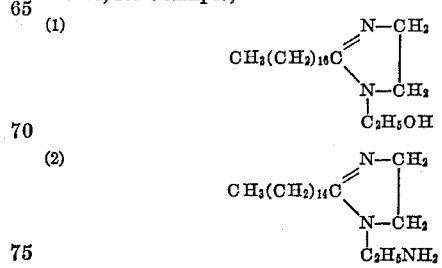

(2)

(3)

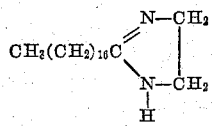

and N-acyl sarcosines in which the acyl group contains from 11 to 18 carbon atoms such as lauryl sarcosine, cocoyl sarcosine, stearoyl sarcosine, oleyl sarcosine, myristol sarcosine, etc. While any for the foregoing surface active agents can be employed, the preferred compounds are the alkaline polyamines, specifically ethylene diamine and diethylene triamine. The amount of surface active agent which is used can vary over a wide range depending on the particular composition of the low fluid loss material. However, usually an amount between about 0.01 and 5 percent by volume of the fluid loss composition (principally petroleum oil) is employed and preferably between about 0.1 and about 2 percent by volume.

A very important consideration in the preparation of a fracturing or drilling fluid in accordance with this invention is the particle size of the oil-insoluble solids. It has been found that the objectives of this invention are attained by dispersing a minute quantity of a finely divided, calcium hydroxide in a petroleum oil. As to size (largest dimension of the particle), the particles can range from 0.005 to 2 microns. Generally, it is preferred to use particles the sizes of which may vary over a somewhat more limited range, namely 0.01 to 2 microns. It is not necessary, however, that the dispersed solid consist entirely of particles having sizes within these limits, as a suitable low fluid loss composition can be prepared wherein all or only a part of the dispersed solids consist of particles the sizes of which vary within the foregoing limits. A product of the latter category is preferred, as such a product is more economical and is available in greater quantities than the former. Regardless of which product is used, it has been found that a satisfactory low fluid loss composition is obtained by using a sufficient quantity of the solid to give a composition having a concentration of at least .0025 pound of particles the sizes of which fall within either of the foregoing size limitations per gallon of oil. Generally, it is preferred to use a quantity of solids such that the concentration of particles within either of the foregoing size limitations is about .05 pound per gallon of oil. Generally speaking, the total amount of solid used should not exceed .20 pound per gallon of oil, with at least .0025 pound of the solid (and preferably about 35 percent of the solid) having a particle size from .005 to 2 microns. This amount of solid provides an economical composition having good fluid loss properties and the viscosity of the composition is not unduly high.

The following examples are presented in illustration of the invention. A fluid loss control formulation containing 30 weight percent sodium postdodecylbenzene overhead sulfonate, 10 weight percent sodium dodecylbenzene sulfonate, and 60 weight percent inorganic salt, principally sodium sulfate, was prepared and tested for fluid loss, the tests being based on the Standard Field Procedure for Testing Drilling Fluids, Section IV, A.P.I. Test RP29, May 1950, carried out under the following conditions:

(a) Additive mixed with a fracturing fluid 3 minutes in a Waring Blendor;
(b) Pressure on filter press—1000 p.s.i.g.;
(c) Temperature—125° F.;
(d) Concentration of additive in fracturing fluid—0.05 pound per gallon;
(e) Volume of filtrate measured for 30-minute intervals; and
(f) Baroid presses used.

The same formulation, containing various surface active agents, was tested in a similar manner. The results of the comparative tests are presented in Table I.

Table I

| Oil | Additive | | Fluid Loss, cc./30 Minutes |
|---|---|---|---|
| | Surface Active Agent | Volume Percent [7] | |
| Willie Cry Crude [8] | (Control) | | 80.0 |
| Do | Tuf Plate 5 [1] | 1.0 | 21.0 |
| Do | Tuf Plate 27 [2] | 1.0 | 17.3 |
| Do | Sarkosyl O [3] | 1.0 | 15.5 |
| Do | Amine O [4] | 1.0 | 21.0 |
| Do | Alrosperse [5] | 1.0 | 24.9 |
| Hunton Lime Crude [9] | (Control) | | 82.0 |
| Do | Ethylene diamine | 0.5 | 13.0 |
| Do | Triethylene tetramine | 0.5 | 25.0 |
| Do | Polyamine H [6] | 0.5 | 18.0 |
| Do | Diethylene tetramine | 0.5 | 11.0 |

[1,2] Surface active agent in oil obtained from Cherokee Laboratories, Inc., Houston, Texas. Believed to be diamines.
[3] Oleyl Sarcosine.
[4] Alkyl substituted imidazoline having the formula

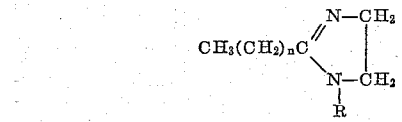

n which n is at least 10 and R is an aklyl alcohol containing 1 to 3 carbon atoms.
[5] Blend of nonionic and cationic surface active agents having the following properties:

Specific gravity (20°C.) _____ 0.96
Freezing Point _____ −10° C.
Viscosity (25° C.) _____ 50 centipoises.
Flash Point _____ Over 115° C.

Obtained from Geigy Chemical Co., Ardsley, N.Y.
[6] Mixture of di- and triethylene amines obtained from Carbide and Carbon Chemical Co., New York, N.Y.
[7] Volume percent of additive in crude oil.
[8] Crude obtained from Willie Cry Lease, Mississippi Chat, Kay County, Oklahoma.
[9] Crude obtained from Meadors Estate Lease No. 1, Hunton Limestone, Cleveland County, Oklahoma.

It is noted from Table I that the formulations containing the added surface active agent provide substantially improved fluid loss control over the control formulation.

In carrying out the invention only a sufficient amount of organo sulfonate dispersing agent need be used to disperse the oil insoluble solids in the petroleum oil. It has been found that from about .015 to .08 pound of dispersing agent per gallon of petroleum oil is sufficient. A larger amount of dispersing agent, up to one pound per gallon or even higher, can be used. However, these larger amounts are not desirable, since the cost of the fracturing or drilling fluid is increased, and no increased benefits are obtained.

In the event the petroleum oil being used contains a naturally occurring or previously incorporated oil-soluble dispersing agent, the amount of oil-soluble dispersing agent added to adapt the oil to a fracturing or drilling fluid can be proportionately reduced. In some oils, the oil-soluble dispersing agent can be dispensed with entirely.

It has been found that only from .01 to .08 pound of oil-insoluble surface active agent (agglutinant) per gallon of petroleum oil is required to produce a satisfactory low liquid loss fluid.

A preferred embodiment of this invention (when used in fracturing) comprises the use of sodium postdodecylbenzene overhead sulfonate as the oil-soluble dispersing agent, sodium sulfate as the finely divided solid, sodium dodecylbenzene as the agglutinant and a polyamine as the surface active agent. While the composition preferably contains these components, it is within the scope of the invention to utilize other alkali metal and alkaline earth metal sulfonates, other surface active agents and any of the finely divided solids previously described. The low fluid loss additive is ordinarily prepared by admixing the components to form a slurry and then evaporating water from the slurry on a drum drier. However, the desired particle size can also be obtained by dissolving the solid in a solvent and then dispersing the solution in the oil, as by emulsification, and then evaporating the solvent; or by forming a solution of the oxide or hydroxide, dispersing such solution in the oil and then acid treating the mass, as by blowing with carbon dioxide, and precipitating the fine insoluble solids in situ and removing the solids.

While it is not desired that the invention be limited to any particular theory, it is believed that the mechanics or operation of the composition of this invention is such that the oil-soluble dispersing agent functions solely to suspend the finely divided oil-insoluble solid in the petroleum oil. When the composition is placed under pressure against a subsurface formation (such as the walls of a well bore), a minor portion of the petroleum oil is initially forced into the pores of the formation. As this oil escapes into the formation, a portion of the oil-insoluble solid particles enters the formation pores and becomes wedged in the pores adjacent the formation surface, as well as deposited on the surface of the formation. The agglutinant forms a gelatinous-like layer or blanket on top of and between the deposited solids to provide a barrier at the formation surface which is substantially impervious to further flow of oil into the formation.

Generally speaking, a small amount of water (for example, 0.33 percent by weight based on the petroleum oil) facilitates the action of the fluid loss composition. It will be observed that this action follows the above-described theory, in that a small amount of water should assist in the precipitation of the agglutinant into a gelatinous-like layer or blanket. However, when an excessive amount of water is used, the agglutinant goes into solution in the water and the effectiveness of the composition is decreased.

Having thus described the invention by providing specific examples thereof, it is to be understood that no undue limitations or restrictions are to be drawn by reason thereof and that many variations and modifications are within the scope of the invention.

We claim:

1. A low liquid loss additive consisting essentially of at least .0025 part of a finely divided solid containing particles varying in size from about 0.005 to 2 microns, an amount of .015 to .08 part of an organo sulfonate dispersing agent, an amount of .01 to .08 part an agglutinant and an amount sufficient to reduce fluid loss of an at least partially oil-soluble surface active agent selected from the group consisting of polyamines, alkyl substituted imidazolines having the formula

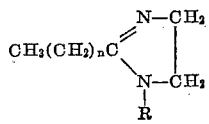

in which $n$ is at least 10 and R is selected from the group consisting of hydrogen and alkyl and substituted alkyl groups containing from 1 to 3 carbon atoms and N-acyl sarcosines.

2. The additive of claim 1 in which said surface active agent is ethylene diamine.
3. The additive of claim 1 in which said surface active agent is triethylene tetramine.
4. The additive of claim 1 in which said surface active agent is diethylene triamine.
5. The additive of claim 1 in which said surface active agent is oleyl sarcosine.
6. A low liquid loss composition consisting essentially of a major portion of petroleum oil having dispersed therein at least .0025 part of finely divided solids containing particles varying in size from about 0.005 to 2 microns, an amount of .015 to .08 part of an organo sulfonate dispersing agent, an amount of .01 to .08 part of an agglutinant and an amount sufficient to reduce fluid loss of an at least partially oil-soluble surface active agent selected from the group consisting of polyamines, alkyl substituted imidazolines having the formula

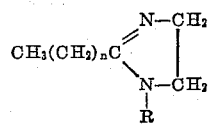

in which $n$ is at least 10 and R is selected from the group consisting of hydrogen and alkyl and substituted alkyl groups containing from 1 to 3 carbon atoms and N-acyl sarcosines.

7. The low liquid loss composition of claim 6 in which said surface active agent is ethylene diamine.
8. The low liquid loss composition of claim 6 in which said surface active agent is triethylene tetramine.
9. The low liquid loss of composition of claim 6 in which said surface active agent is diethylene triamine.
10. The low liquid loss composition of claim 6 in which said surface active agent is oleyl sarcosine.
11. In a process of working a well wherein a petroleum oil is forced into the well bore under pressure, the method of sealing subsurface formations traversed by the well bore against loss of appreciable amounts of said oil to the formations, which comprises incorporating in said oil an additive comprising a finely divided solid containing particles varying in size from about 0.005 to 2 microns, an organo sulfonate dispersing agent, an agglutinant, and an amount sufficient to reduce fluid loss of an at least partially oil-soluble surface active agent selected from the group consisting of polyamines, alkyl substituted imidazolines having the formula

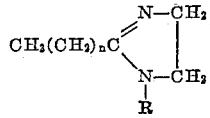

in which $n$ is at least 10 and R is selected from the group consisting of hydrogen and alkyl and substituted alkyl groups containing from 1 to 3 carbon atoms and N-acyl sarcosines.

12. The process of claim 11 in which said surface active agent is ethylene diamine.
13. The process of claim 11 in which said surface active agent is triethylene tetramine.
14. The process of claim 11 in which said surface active agent is diethylene triamine.
15. The process of claim 11 in which said surface active agent is oleyl sarcosine.

References Cited in the file of this patent

UNITED STATES PATENTS

| | | |
|---|---|---|
| 2,049,467 | Mnookin | Aug. 4, 1936 |
| 2,779,735 | Brown et al. | Jan. 29, 1957 |